UNITED STATES PATENT OFFICE.

RAOUL PIERRE PICTET, OF GENEVA, AND GEORGES LOUIS BRÉLAZ, OF LAUSANNE, SWITZERLAND.

MANUFACTURE OF PULP FROM WOODY MATTER.

SPECIFICATION forming part of Letters Patent No. 331,323, dated December 1, 1885.

Application filed February 13, 1885. Serial No. 155,839. (No specimens.) Patented in France April 8, 1883, No. 155,026; in Belgium May 21, 1883, No. 61,437; in Germany May 22, 1883, No. 26,331, and in England June 27, 1884, No. 9,509.

*To all whom it may concern:*

Be it known that we, RAOUL PIERRE PICTET and GEORGES LOUIS BRÉLAZ, citizens of Switzerland, residing, the former at Geneva and the latter at Lausanne, have invented certain new and useful Improvements in the Manufacture of Pulp from Woody Matter, (for which we have obtained Letters Patent in England No. 9,509, dated June 27, 1884; in France, No. 155,026, dated April 8, 1883; in Belgium, No. 61,437, dated May 21, 1883, and in Germany, No. 26,331, dated May 22, 1883;) and we do hereby declare the following to be a full, clear, and exact description of the invention.

This invention relates to improvements in the process of treating wood for converting the fibers thereof into pulp for use in the manufacture of paper.

In the treatment of wood for the purposes stated the general practice has been to use alkaline solutions of soda, combined in various proportions with certain acids—such, for instance, as sulphurous acid, hydrochloric acid, &c. These solutions have been heated in digesting-vessels, and the high temperature resulting from this process of heating developing a pressure of from six to seven atmospheres, the wood being disintegrated by the action of the boiling solution. The gum, resinous constituents, and other incrustating or cementing substances that cement the fibers together are decomposed, destroyed, or dissolved, while the pure cellulose, which constitutes the essential elements of the ligneous fibers, is separated therefrom. To this end temperatures varying from 120° to 140° had to be employed, otherwise the disintegration was found to be only partial, the wood remaining in a condition unfit for further treatment. The high temperature referred to, however, converts a large proportion of the resinous and gummy constituents of the wood into tar and pitch—that is to say, carbonaceous bodies that penetrate into the fiber and render its bleaching very difficult, very laborious, and costly, while the frequent washing and lixiviation necessary to bleach such products seriously affect the strength of the fiber, its whiteness, and also materially reduce the percentage of the product, in some instances as much as eighteen per cent. These difficulties and detrimental results necessarily enhance the cost of production very materially, while the fiber itself suffers considerably in strength from the repeated action of the chloride of lime employed in the process of bleaching. It will thus be seen that the difficulties are due chiefly to the carbonization of certain constituent parts of the fibers under temperatures exceeding 100° centigrade, such carbonized constituents being insoluble and incapable of being bleached, and as they permeate the fibers cannot be removed entirely. To overcome these difficulties, it is therefore necessary to chemically treat the wood at a temperature sufficiently low to insure that in the solution and decomposition of the cementing substances of the fibers the carbon will remain chemically combined with other elements—such as the hydrogen, oxygen, and nitrogen—in order to obtain an increased product of superior quality, and render the process more economical.

Our invention therefore consists, essentially, in the use of sursaturated solutions of sulphurous acid—say from one hundred to one hundred and fifty grams of sulphurous acid to a liter of water—employed under a pressure of from three to six atmospheres, and at a temperature not exceeding 100° centigrade. Under these conditions the cementing substances of the wood fiber retain their chemical character without a trace of decomposition of a nature to show carbonization, while the liquor completely permeates the wood and dissolves out all the cementing constituents that envelope the fibers.

The use of sursaturated solutions under conditions above set forth we believe to be entirely new and of our invention, which latter may be carried out in any convenient manner and by any known or suitable means.

In practice we cut the wood into small blocks, as usual, and charge them into a digesting-vessel of such strength as will resist the necessary pressure, and of any desired or usual form and material—as, for instance, of copper lined with lead. Water is then admitted to the vessel, and afterward the sulphurous acid from a suitable receiver, in which it is stored in a liquid form, until the proportion of acid has reached that above indicated—namely, from one hundred to one hundred and fifty liters of acid to one thousand liters of water. The volume of the bath will be determined by the absorbing capacity of the wood, and is preferably so regulated as not to materially exceed that capacity.

In practice we prefer to form a partial vacuum in the digesting-vessel, whereby the pores of the wood are opened, when it will be in a condition to more readily absorb the solution, thereby accelerating the process of disintegration. When disintegration has resulted, which generally occurs in from twelve to twenty-four hours, according to the nature of the wood treated, the liquor, which is usually not quite spent in one operation, is transferred to another digester, a sufficient quantity of water and acid being added to complete the change.

In order to remove the liquor absorbed by the wood, the latter is compressed, the digester being connected with a gas-receiver, into which the free gas escapes, and in which it is collected for use again in the operation of disintegration. The bath is heated and kept at a temperature of from 80° to 90° centigrade by means of a coil in the digester supplied with steam from a suitable generator. The wood, after disintegration undergoes the usual treatment for converting it into paper-pulp, which may thus be readily bleached by means of chloride of lime.

The unaltered by-products contained in the bath may be recovered and treated for use in various branches of the arts by well-known methods and means.

Having now described our invention, what we claim is—

1. The herein-described process of treating wood for conversion into paper-pulp, which consists in subjecting it to the action of a sursaturated solution of sulphurous acid at a temperature not exceeding 100° centigrade.

2. The herein-described process of treating wood for conversion into paper-pulp, which consists in first subjecting the same to the action of a vacuum and to that of a sursaturated solution of sulphurous acid at a temperature not exceeding 100° centigrade.

In testimony whereof we affix our signatures in presence of two witnesses.

RAOUL PIERRE PICTET.
GEORGES LOUIS BRÉLAZ.

Witnesses:
G. DE MESTRAL,
PETER NAYLOR.